United States Patent
Koernle et al.

(10) Patent No.: US 12,332,392 B2
(45) Date of Patent: Jun. 17, 2025

(54) GENERATION OF A HIGH VOLTAGE TO SUPPLY A PHOTOMULTIPLIER

(71) Applicant: VEGA Grieshaber KG, Wolfach (DE)

(72) Inventors: Ralf Koernle, Zell A. H. (DE); Fabian Rank, Gutach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 18/764,756

(22) Filed: Jul. 5, 2024

(65) Prior Publication Data

US 2025/0015716 A1  Jan. 9, 2025

(30) Foreign Application Priority Data

Jul. 6, 2023  (DE) .................. 10 2023 206 449.9

(51) Int. Cl.
  *G01T 1/208* (2006.01)
  *G01T 1/175* (2006.01)
  *H02M 1/00* (2007.01)
  *H02M 3/07* (2006.01)

(52) U.S. Cl.
  CPC .............. *G01T 1/208* (2013.01); *G01T 1/175* (2013.01); *H02M 1/0003* (2021.05); *H02M 3/07* (2013.01)

(58) Field of Classification Search
  CPC ....... H02M 3/07; H02M 1/0003; G01T 1/208; G01T 1/175; H01J 43/18
  See application file for complete search history.

(56) References Cited

U.S. PATENT DOCUMENTS

| 8,487,262 B2 | 7/2013 | Damm et al. |
| 2007/0103128 A1* | 5/2007 | Shin ................ H02M 3/07 |
| | | 323/280 |
| 2018/0120454 A1 | 5/2018 | Mueller et al. |

(Continued)

FOREIGN PATENT DOCUMENTS

| CN | 107072021 A * | 8/2017 | ............ H02M 3/157 |
| DE | 10 2007 053 860 A1 | 5/2009 | |
| EP | 2 208 031 B1 | 4/2015 | |

(Continued)

OTHER PUBLICATIONS

Electron Tubes Limited, "Understanding Photomultipliers, catch the light", Electron Tubes, total 28 pages. URL: www.electrontubes.com.

(Continued)

*Primary Examiner* — Chih-Cheng Kao
(74) *Attorney, Agent, or Firm* — Oblon, McClelland, Maier & Neustadt, L.L.P.

(57) ABSTRACT

A power supply for a photomultiplier is provided, the power supply including: a charge pump configured to generate a first high voltage for the photomultiplier; a DC/DC converter configured to generate a second high voltage for the charge pump; a first control loop configured to control the charge pump and/or the DC/DC converter, the first control loop being controlled by the first high voltage; and a second control circuit configured to control the DC/DC converter, the second control circuit being controlled by the second high voltage. A radiometric measuring device for measuring a filling level and/or a limit level of a product in a container is also provided. A method of supplying power to the photomultiplier is also provided.

16 Claims, 4 Drawing Sheets

(56) References Cited

U.S. PATENT DOCUMENTS

2021/0399631 A1   12/2021   Saint-Macary

FOREIGN PATENT DOCUMENTS

| EP | 3 312 635 A1 | 4/2018 |
| WO | WO 2020/215277 A1 | 10/2020 |

OTHER PUBLICATIONS

German Office Action mailed on May 15, 2024, issued in German Application No. 10 2023 206 449.9, with English translation, total 6 pages.
Combined Search and Examination Report issued Oct. 22, 2024 in United Kingdom Patent Application No. GB2409771.9, 6 pgs.

* cited by examiner

GENERATION OF A HIGH VOLTAGE TO SUPPLY A PHOTOMULTIPLIER

CROSS-REFERENCE TO RELATED APPLICATIONS

This application claims the benefit of priority under 35 U.S.C. § 1119 from German Patent Application No. 10 2023 206 449.9 filed on 6 Jul. 2023, the entire content of which is incorporated herein by reference.

TECHNICAL FIELD

The invention relates to a power supply, in particular for a photomultiplier. The invention also relates to a radiometric measuring device, a method, and a nonvolatile, computer-readable storage medium.

BACKGROUND

A photomultiplier or photoelectron multiplier (also: photomultiplier tube, PMT) is an electron tube that can detect weak light signals by generating and amplifying an electrical signal. A photomultiplier has several electrodes, i.e., a photocathode and several secondary electron multipliers connected downstream. The electrodes (or just the secondary electron multipliers) are often referred to as dynodes. The electrical signal is amplified by the fact that each electron hitting a dynode knocks out several secondary electrons. For this purpose, a high voltage is applied to the photomultiplier or the dynodes. The step-up conversion required to generate this high voltage may have a high current requirement, at least temporarily. This may, further, be complicated by the fact that a regulation of the step-up conversion needs delays to take into account (often called "dead times" in regulation), which may result from the operating principle of the photomultiplier described above. Measures to reduce the current requirement of the photomultiplier may therefore be desirable.

SUMMARY

It is an object of the invention to provide a device or a method that can contribute to a reduction of the power requirements of a photomultiplier. This task is solved by the subject matter of the independent claims. Further embodiments of the invention result from the sub-claims and the following description.

An aspect relates to a power supply for a photomultiplier. The power supply has a charge pump, which is configured to generate a first high voltage for the photomultiplier, and a DC/DC converter, which is configured to generate a second high voltage for the charge pump. Furthermore, the power supply has a first control circuit, which is configured to control the charge pump and/or the DC/DC converter, the first control circuit being controlled by the first high voltage, and a second control circuit, which is configured to control the DC/DC converter, the second control circuit being controlled by the second high voltage.

The first high voltage generated by the charge pump may be a stepped or cascaded high voltage, i.e., the first high voltage may have N stages for N−1 dynodes of the photomultiplier. In particular, the last stage of the high voltage may be used for regulation. This may also be referred to as the "output voltage" (or here: first high voltage). The input voltage of the charge pump may be generated by a DC/DC converter. The DC/DC converter is sometimes also referred to as a step-up converter, step-down converter, or boost converter.

The charge pump and the DC/DC converter are controlled by two different control circuits. The first control circuit is configured to control the charge pump. The second control circuit is configured to control the DC/DC converter. The first and second control loops may be implemented as completely separate control loops. In an embodiment, these two control loops may be controlled by a single microcontroller, for example. In an embodiment, these two control loops may have different parameters, e.g., different reaction speeds. The setpoint value for the second high voltage may be present as an "external" and/or predefined value and may, for example, be specified by a microcontroller.

By splitting the regulation of the power supply into two control circuits, advantageously a reduction of the power requirements of the entire device, in which the power supply is arranged, is achieved. This is because the time delay caused by the operating principle of the photomultiplier is rendered insignificant by splitting the DC/DC converter into two control circuits. Therefore, the DC/DC converter may be controlled without having to take into account the time delay (i.e., the dead times) of the photomultiplier. In particular, the regulation of the step-up converter would have to be slowed down in order to prevent the voltage $U_{in}$ at the input of the charge pump from overshooting. An increased current consumption of the charge pump during the switch-on process (with $U_{in}=0$), i.e., when all capacities of the multiplier have to be charged, may also be avoided. The resulting reduction of the power requirements of the entire device or system may be particularly advantageous for devices that must have a low power requirement, for example sensors that are operated autonomously (i.e., without an external power supply), or sensors or other devices that are supplied with energy by a two-wire loop. Separating the regulation also enables specific optimizations for the DC/DC converter, such as independent standby states for the two voltage converters, each with lower current consumption. When one of the converters is active, the other may go into standby.

In some embodiments, the first control circuit has a slower reaction speed than the second control circuit. The first control circuit may operate with a larger time constant of 1 or 2 seconds, for example, to avoid current peaks in the charge pump. The second control circuit may have a time constant of 10 ms or 20 ms, for example. Advantageously, splitting the regulation of the power supply into two control loops enables the second control loop to react quickly without having to take the time delay of the photomultiplier into account.

In some embodiments, dynodes of the photomultiplier are operated with stepped high voltages that are parts of the first high voltage. For example, the first high voltage for N−1 dynodes of the photomultiplier may have N (voltage) steps to ensure the operation of the dynodes.

In some embodiments, the DC/DC converter is operated with a variable frequency. The variable frequency may, for example, be realized as a pulse width modulation (PWM) with a frequency between 0.1 Hz and 10000 Hz, e.g., between 1 Hz and 1000 Hz. The pulse duration may be between 1 μs and 15 μs, for example. The variable frequency makes it advantageous to dispense with switching off the entire control system—or even the entire device—completely, thereby avoiding the disadvantages of a frequent "cold start" of the device. Furthermore, the variable frequency and/or pulse duration of the PWM allows to realize an extremely energy-saving (because continuous) control.

In some embodiments, the second control circuit is activated periodically and/or event driven. An event-driven activation may take place, for example, if an unscheduled measurement is to be performed and/or depending on system factors such as a charge state of an energy storage device of the system. Periodic activation may take place, for example, every second, every minute, every hour, and/or in a selectable period.

In some embodiments, the photomultiplier is supplied with a voltage between 500 V and 1000 V, for example between 700 V and 900 V. The voltage may depend, for example, on the type of photomultiplier and/or the number of dynodes.

In numerous embodiments, the first control loop and/or the second control loop is realized by means of a microcontroller. Powerful microcontrollers may be capable of controlling the first control loop and the second control loop independently of each other. The output voltage and/or the input voltage of the photomultiplier may be recorded by means of at least one analog-to-digital converter (A/D converter, ADC). One embodiment may provide a single ADC and a multiplexer. The DC/DC converter may be controlled by means of at least one switch that controls, for example, the duration of the PWM signal. A microcontroller may be used on which a large number of components required to realize the described control are integrated. A high level of integration of the components—e.g., if all or almost all components are integrated—may advantageously contribute to further power savings. In addition, this may simplify the circuit and/or its realization.

In some embodiments, the power supply is powered by a two-wire loop. The two-wire loop may, for example, implement the Highway Addressable Remote Transducer (HART) protocol.

An aspect relates to a radiometric measuring device for measuring a filling level and/or a limit level of a filling material in a container, wherein the radiometric measuring device comprises a photomultiplier and a voltage supply according to one of the preceding claims. The radiometric measuring device may further comprise components such as a scintillator. The radiometric measuring device may be supplied with energy via a two-wire loop and/or may have an energy storage device.

An aspect relates to a method for supplying voltage to a photomultiplier comprising a power supply according to one of the preceding claims, the method comprising the steps of:
  detecting a first high voltage of the photomultiplier, which is generated by a charge pump;
  detecting a second high voltage for the charge pump, which is generated by a DC/DC converter;
  controlling the first high voltage of the photomultiplier by means of a first control circuit; and
  controlling the second high voltage for the charge pump by means of a second control circuit.

In some embodiments, the first control loop has a slower reaction speed than the second control loop.

In some embodiments, the DC/DC converter is operated at a variable frequency.

An aspect relates to a nonvolatile computer-readable storage medium having a program stored therein which, when executed on a microcontroller, instructs a power supply as described above and/or below to perform the steps as described above and/or below.

It should also be noted that the various embodiments described above and/or below may be combined with one another.

For further clarification, the invention is described with reference to embodiments illustrated in the figures. These embodiments are to be understood only as examples and not as limitations.

BRIEF DESCRIPTION OF THE DRAWINGS

This shows.

DETAILED DESCRIPTION OF EMBODIMENTS

Figure 1:
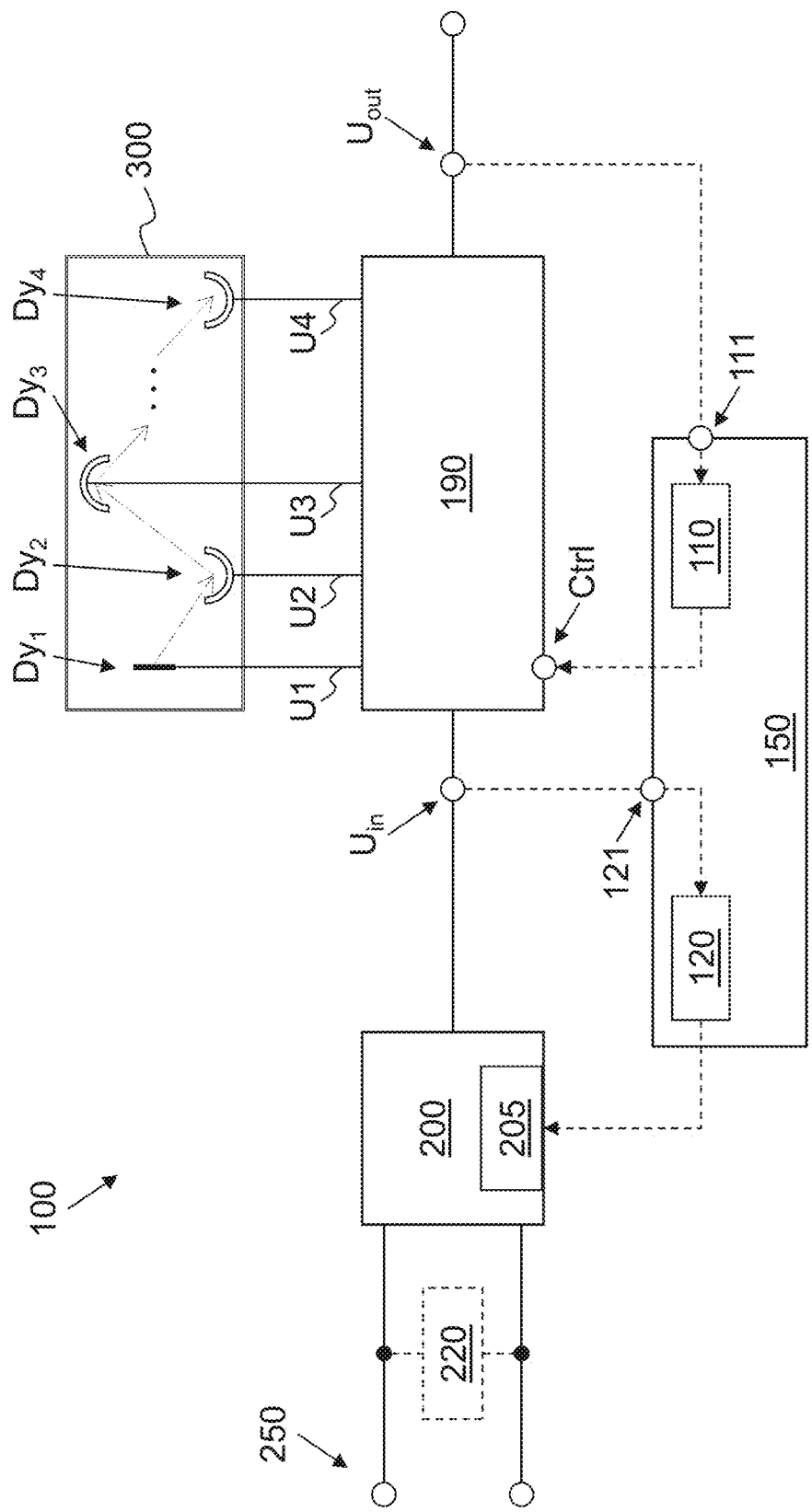
FIG. 1 schematically a power supply according to an embodiment.

FIG. 1 schematically shows a power supply 100 for a photomultiplier 300 according to an embodiment. The photomultiplier 300 is supplied by a high voltage $U_{out}$, which is generated by a charge pump 190. The high voltage $U_{out}$ has partial voltages U1 to U4, each of which is fed to the dynodes of the photomultiplier 300. The highest partial voltage U4 may be identical to the output voltage, the high voltage $U_{out}$. The number of partial voltages may be significantly higher for a real photomultiplier; for example, a photomultiplier may contain 10 or more dynodes, which makes 10 or more partial voltages necessary. The power supply 100 also has a DC/DC converter 200, which is configured to generate a second high voltage $U_{in}$ for the charge pump 190 and provides the second high voltage $U_{in}$.

As can be clearly seen in FIG. 1, the power supply 100 has two separate control circuits: a first control circuit 110, which is configured to control the charge pump 190, and a second control circuit 120, which is configured to control the DC/DC converter 200. The first control circuit 110 is controlled by the first high voltage $U_{out}$ and acts on the terminal Ctrl of the charge pump 190. The second control circuit 120 is controlled by the second high voltage $U_{in}$ and acts on a switch 205, which, for example, controls the duration and frequency of PWM signals for controlling the DC/DC converter 200. The first control circuit 110 may have a slower response speed than the second control circuit 120. Both control circuits may be realized by a single microcontroller 150. The microcontroller 150 may have further components, e.g., one ADC at each of the inputs 111, 121 of the first and the second control loops 110 and 120 respectively. Instead of two ADCs, there may also be a single ADC, which multiplexes the inputs 111, 121.

The power supply 100 is connected to a two-wire loop 250, which supplies the power supply 100 with energy. The power supply 100 may optionally have an energy storage 220, e.g., a rechargeable battery or capacitor.

Figure 2:
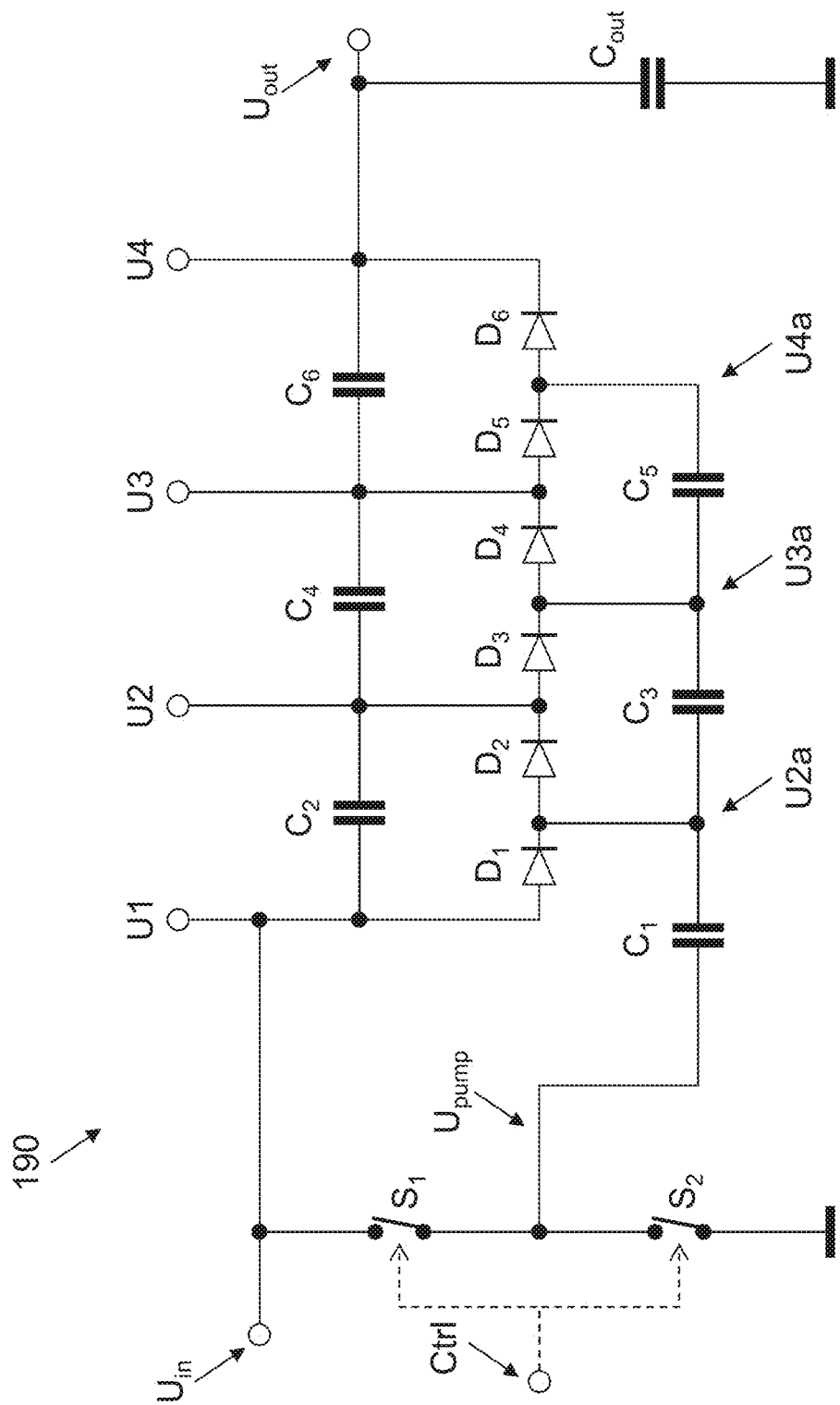
FIG. 2 schematically a charge pump according to an embodiment.
Figure 3:
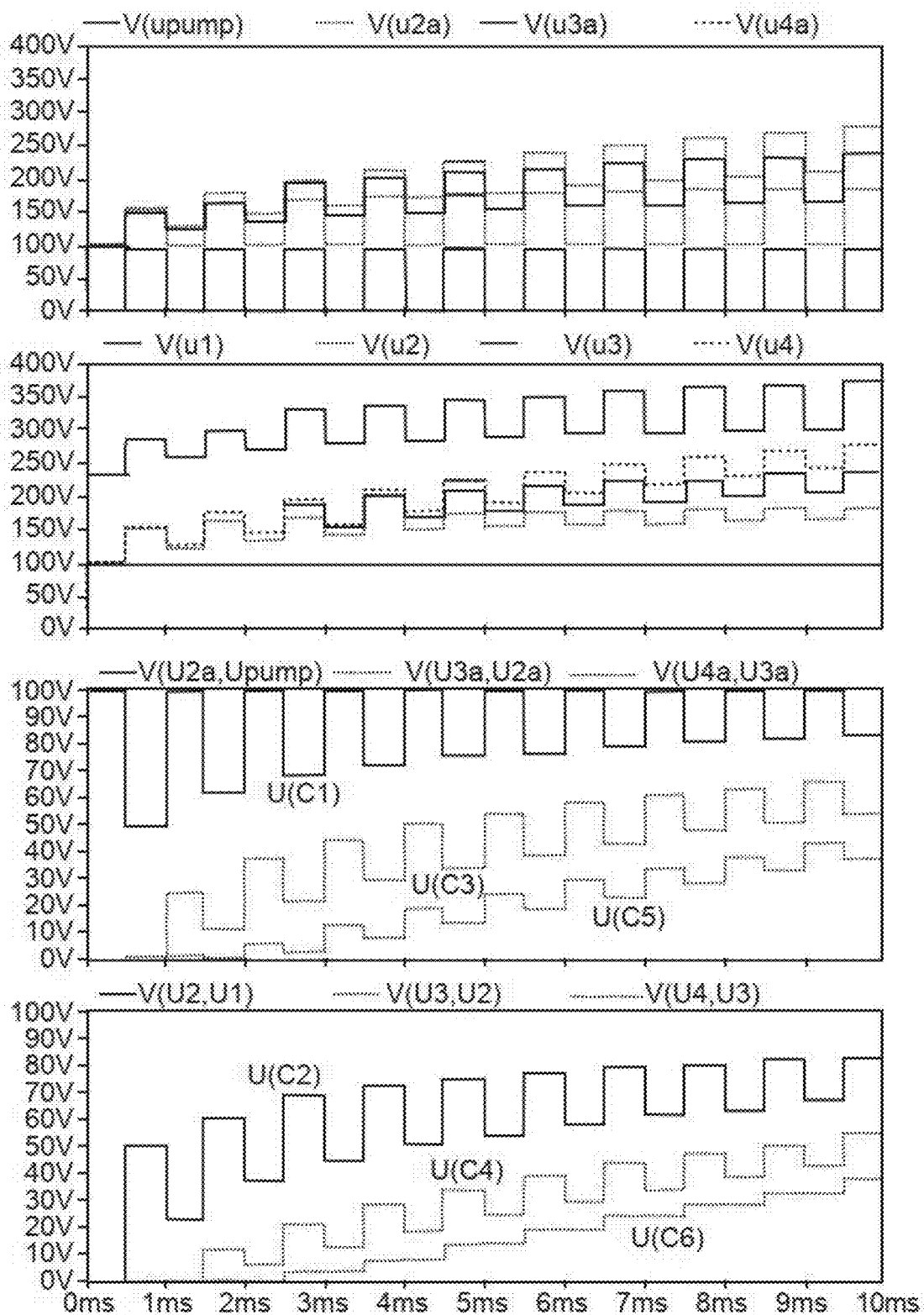
FIG. 3 schematically a start phase of a charge pump according to an embodiment.
Figure 4:
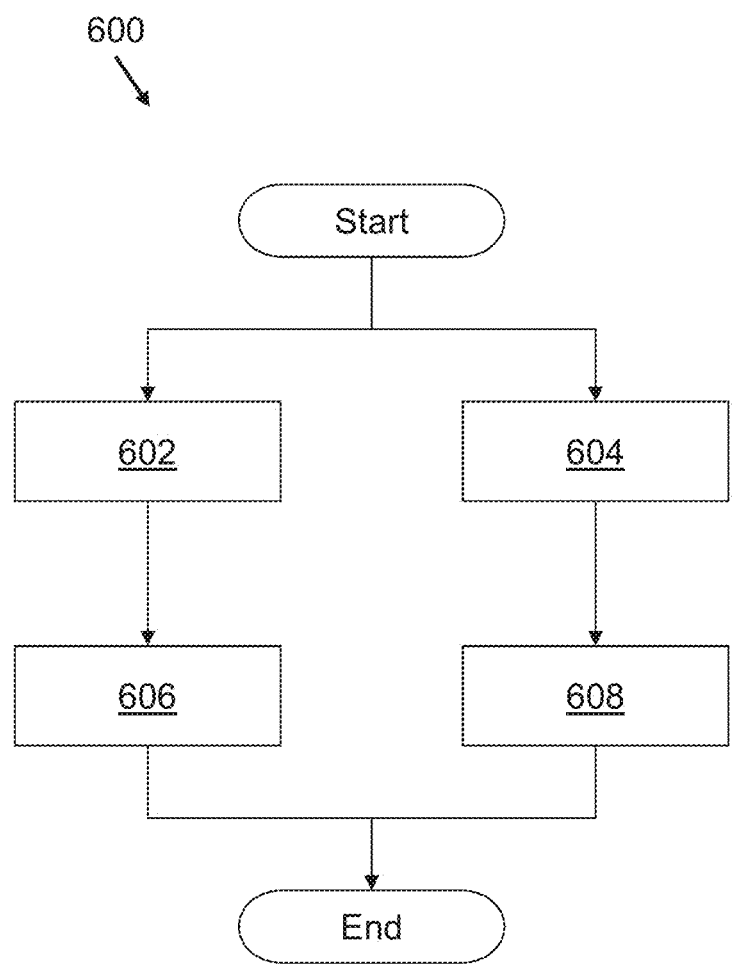
FIG. 4 a flow chart showing a method according to an embodiment.

FIG. 2 schematically shows a charge pump 190 according to an embodiment. The charge pump 190 is connected via a connection $U_{in}$ to a high voltage, which is provided, for example, by a DC/DC converter 200 (see, for example, FIG. 1). The charge pump 190 has a plurality of outputs U1-U4, which provide the high voltages for the dynodes of the photomultiplier 300. In FIG. 2, only four outputs U1-U4 are shown for better visualization; a real photomultiplier may contain 10 or more dynodes, which requires 10 or more partial voltages. The charge pump 190 also has an output $U_{out}$. A capacitor Cout may be connected to the output $U_{out}$. This output $U_{out}$ may be connected to a control circuit 110, which regulates the high voltage $U_{in}$ and acts on the control input Ctrl. The control input Ctrl controls the switches $S_1$ and $S_2$, by means of which the functionality of the charge pump 190 is realized. Details of this control system are described in the following figures. FIGS. 3-5 use timing diagrams to describe the function of the charge pump 190 as an example. For clarification, the course of the voltages U2$a$, U3$a$, U4$a$ are also shown in these figures.

FIG. 3 schematically shows a start phase of a charge pump 190 according to an embodiment, e.g., based on a circuit as shown in FIG. 2. The interval between two vertical lines is 1 ms. In the steady state, with $U_{pump}$=Low (here 0V), the voltages are: U2$a$=U1=100V, U3$a$=U2=200V, U4$a$=U3=300V. In the steady state, with $U_{pump}$=High (here 100V): U2$a$=U2=200V, U3$a$=U3=300V, U4$a$=U4=400V. C1, C3, C5 are the pump capacitors whose voltage is added to the rectangular voltage $U_{pump}$. The voltages at the capacitors C2, C4, C6 are added to the constant voltage U1.

In the example shown, the input voltage $U_{in}$ is quadrupled. In this example, the input voltage $U_{in}$ is 100 V.

Before the start time (0 ms), all capacitors are discharged, i.e., capacitors C1-C6 have 0 V and switches $S_1$ and $S_2$ are open.

At the start time (0 ms), switch $S_1$ is closed, $S_2$ remains open, i.e., $U_{pump}$=0 V. This charges C1 via a diode D1 to U2$a$=$U_{in}$ and the series circuit consisting of C2, C4, C6 is charged to U4=$U_{in}$.

Then (time 0.5 ms) switch $S_1$ is opened and switch $S_2$ is closed, i.e., $U_{pump}$=$U_{in}$. This means that U2$a$=$U_{pump}$+U (C1)=2*$U_{in}$. The charge of C1 is therefore distributed over C1+C2 up to U2=U2$a$, for $U_{pump}$=$U_{in}$, U2$a$=$U_{pump}$+U (C1)=2*$U_{in}$.

Then (time 1 ms) switch $S_1$ is closed again and switch $S_2$ is opened, i.e., $U_{pump}$=0. C1 is charged via D1 to U2$a$=$U_{pump}$+U (C1)=$U_{in}$.

Then (time 1.5 ms) switch $S_1$ is opened again and switch $S_2$ is closed, i.e., $U_{pump}$=$U_{in}$.

Then (time 2 ms) switch $S_1$ is closed again and switch $S_2$ is opened, i.e., $U_{pump}$=0.

This pattern is continued accordingly at the other points in time.

It becomes clear that the first control loop—due to the operating principle of the charge pump—needs to take into account the time constants for charging the capacitors C1-C6. By separating the control loops, the second control loop may advantageously have a significantly shorter time constant.

After a run-up phase (not shown), a steady state is reached. In the steady state, the following voltages are applied to C2, C4, and C6:

$$U2 - U1 = U3 - U2 = U4 - U3 = U_{in}$$

This means that—in this example—the voltage $U_{in}$ is applied between each of the dynodes.

FIG. 4 shows a flow chart with a method 600 for supplying voltage to a photomultiplier 300 (see, e.g., FIG. 1) according to an embodiment. In a step 602, a first high voltage $U_{out}$ of the photomultiplier 300 is detected. The high voltage $U_{out}$ is generated by a charge pump 190. In a step 604, a second high voltage $U_{in}$ is detected for the charge pump 190. The high voltage is generated by a DC/DC converter 200. In a step 606, the first high voltage $U_{out}$ of the photomultiplier 300 is controlled by means of a first control circuit 110. In a step 608, the second high voltage for the charge pump 190 is controlled by means of a second control circuit 120. Steps 602 to 608 may be repeated several times. Steps 602 and 604 and steps 606 and 608 may be performed substantially in parallel (quasi-parallel if a monoprocessor microcontroller is used for control) or in some other temporal relationship to each other. In particular, the first control loop 110 may have a slower response speed than the second control loop 120. The DC/DC converter 200 may be operated at a variable frequency.

LIST OF REFERENCE SIGNS 100 power supply
110 first control loop
111 input
120 second control loop
121 input
150 microcontroller
190 charge pump
200 up converter
205 switch
220 energy storage
250 two-wire loop
300 photomultiplier
600 procedure
602-608 steps
Ctrl control input of the charge pump
$Dy_1$-$Dy_4$ dynodes of the photomultiplier
U1-U4 partial voltages
U2$a$-U4$a$ partial voltages
$U_{in}$ input voltage
$U_{out}$ output voltage

The invention claimed is:

1. A power supply for a photomultiplier, the power supply comprising:
    a charge pump configured to generate a first high voltage for the photomultiplier;
    a DC/DC converter configured to generate a second high voltage for the charge pump;
    a first control loop configured to control the charge pump, wherein the first control loop is controlled by the first high voltage; and
    a second control loop configured to control the DC/DC converter, the second control loop being controlled by the second high voltage.

2. The power supply according to claim 1, wherein the first control loop has a slower reaction speed than the second control loop.

3. The power supply according to claim 1, wherein dynodes of the photomultiplier are operated with stepped high voltages, which are parts of the first high voltage.

4. The power supply according to claim 1, wherein the DC/DC converter is operated with a variable frequency.

5. The power supply according to claim 1, wherein the DC/DC converter and/or the charge pump is operated at a frequency between 0.1 Hz and 10000 Hz.

6. The power supply according to claim 1, wherein the DC/DC converter and/or the charge pump is operated at a frequency between 1 Hz and 1000 Hz.

7. The power supply according to claim 1, wherein the second control loop is activated periodically and/or event-driven.

8. The power supply according to claim 1,
wherein the photomultiplier is supplied with a voltage of between 500 V and 1000 V.

9. The power supply according to claim 1,
wherein the photomultiplier is supplied with a voltage of between 700 V and 900 V.

10. The power supply according to claim 1,
wherein the first control loop and/or the second control loop is realized by means of a microcontroller.

11. The power supply according to claim 1,
wherein the power supply is supplied with energy by a two-wire loop.

12. A radiometric measuring device for measuring a filling level and/or a limit level of a product in a container, wherein the radiometric measuring device comprises the photomultiplier and the power supply according to claim 1.

13. A method of supplying power to the photomultiplier comprising the power supply according to claim 1, the method comprising the steps of:

detecting a first high voltage of the photomultiplier, which is generated by a charge pump;

detecting a second high voltage for the charge pump, which is generated by a DC/DC converter;

controlling the first high voltage of the photomultiplier by means of a first control loop; and controlling the second high voltage for the charge pump by means of a second control loop.

14. The method according to claim 13,
wherein the first control loop has a slower reaction speed than the second control loop.

15. The method according to claim 13,
wherein the DC/DC converter is operated with a variable frequency.

16. A nonvolatile computer-readable storage medium having a program stored therein which, when executed on a microcontroller, instructs the power supply to perform the steps of the method according to claim 13.

* * * * *